US012683428B2

(12) United States Patent
Nayak et al.

(10) Patent No.: US 12,683,428 B2
(45) Date of Patent: Jul. 14, 2026

(54) SYSTEM FOR IDENTIFICATION OF LOADS IN A RESIDENTIAL BRANCH OF ELECTRICAL CIRCUIT

(71) Applicant: Siemens Industry, Inc., Alpharetta, GA (US)

(72) Inventors: Amit Nayak, Atlanta, GA (US); Westin Williams, Marietta, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 464 days.

(21) Appl. No.: 18/334,000

(22) Filed: Jun. 13, 2023

(65) Prior Publication Data

US 2024/0421632 A1      Dec. 19, 2024

(51) Int. Cl.
*H02J 13/12*          (2026.01)
*H02J 13/13*          (2026.01)
*H02J 13/14*          (2026.01)

(52) U.S. Cl.
CPC .......... *H02J 13/12* (2026.01); *H02J 13/1331* (2026.01); *H02J 13/14* (2026.01)

(58) Field of Classification Search
CPC .......... H02J 13/00002; H02J 13/00006; H02J 13/00022; G01R 31/327
See application file for complete search history.

(56) References Cited

U.S. PATENT DOCUMENTS

| | | | | |
|---|---|---|---|---|
| 5,600,526 | A * | 2/1997 | Russell .................. | G01R 31/52 |
| | | | | 361/115 |
| 6,671,148 | B2 | 12/2003 | Evans et al. | |

| | | | | |
|---|---|---|---|---|
| 6,882,158 | B2 | 4/2005 | Blades | |
| 7,864,492 | B2 | 1/2011 | Restrepo et al. | |
| 8,929,036 | B2 | 1/2015 | Kinsel et al. | |
| 11,876,371 | B1 * | 1/2024 | Schwarzbach .... | H02J 13/00034 |
| 2009/0248329 | A1 | 10/2009 | Restrepo | |
| 2013/0329331 | A1 * | 12/2013 | Erger ..................... | H01H 71/04 |
| | | | | 361/102 |
| 2014/0266287 | A1 * | 9/2014 | Reeder, III .......... | G01R 1/0408 |
| | | | | 324/538 |
| 2016/0124048 | A1 * | 5/2016 | Ashtekar ............ | G01R 31/3272 |
| | | | | 324/424 |

(Continued)

FOREIGN PATENT DOCUMENTS

EP          4120310 A1      1/2023

*Primary Examiner* — Scott T Baderman

(57) ABSTRACT

A system for identification of loads in a residential branch of electrical circuit including a plurality of electrical outlets is provided. It comprises a residential power distribution panel comprising an electronic circuit breaker. The electronic circuit breaker may experience unwanted tripping in the residential branch of electrical circuit. The system further comprises a residential fault diagnostics tool connected to the residential branch of electrical circuit. It can record, store, experience electrical conditions which are also experienced by the electronic circuit breaker. The system further comprises a communicating device to display relevant diagnostics information for an end user. The mobile device is configured to be in wireless communication with the residential fault diagnostics tool. The mobile application (APP) includes a classification analyzer for the identification of the loads. A decision of the identification is provided on the mobile application (APP).

13 Claims, 16 Drawing Sheets

First System

(56)                References Cited

U.S. PATENT DOCUMENTS

| | | | |
|---|---|---|---|
| 2018/0284169 A1 | 10/2018 | Kwan et al. | |
| 2020/0006934 A1* | 1/2020 | Malacara-Carrillo ...................... H01H 71/10 | |
| 2020/0052482 A1 | 2/2020 | Ostrovsky et al. | |
| 2020/0366078 A1 | 11/2020 | Telefus et al. | |
| 2020/0366079 A1* | 11/2020 | Telefus ............. H02J 13/00022 | |
| 2021/0173364 A1* | 6/2021 | Telefus ..................... H02J 3/02 | |
| 2021/0278453 A1 | 9/2021 | Denney | |
| 2022/0140597 A1 | 5/2022 | Pal et al. | |
| 2022/0196722 A1 | 6/2022 | Schroeder | |
| 2022/0224101 A1 | 7/2022 | Jhaveri | |
| 2022/0247163 A1 | 8/2022 | Leidy et al. | |
| 2022/0399174 A1* | 12/2022 | Telefus .................. H02H 3/385 | |
| 2023/0012859 A1 | 1/2023 | Janakiraman et al. | |
| 2023/0051020 A1* | 2/2023 | Wambsganss ....... H02H 1/0015 | |
| 2023/0063811 A1* | 3/2023 | Jakupi ..................... H02H 3/04 | |
| 2023/0314497 A1* | 10/2023 | Nayak .................. H02H 1/0007 | |
| 2023/0411948 A1* | 12/2023 | Jimenez Gonzalez ...................... H02H 3/093 | |
| 2024/0170941 A1* | 5/2024 | Rivers ...................... G06F 8/65 | |

* cited by examiner

FIG. 18

SYSTEM FOR IDENTIFICATION OF LOADS IN A RESIDENTIAL BRANCH OF ELECTRICAL CIRCUIT

BACKGROUND

1. Field

Aspects of the present invention generally relate to a system for identification of loads in a residential branch of electrical circuit including a plurality of electrical outlets with a residential fault diagnostics tool and a communicating device such as a mobile device using a classification analyzer for the identification of the loads.

2. Description of the Related Art

The customer or end user of a residential power distribution system sometimes experiences the unwanted or nuisance trip of an electronic circuit breaker. The electronic circuit breaker protecting a specific branch in these cases is reacting to the type of conditions present which may have caused the nuisance tripping. Sometimes the conditions are very similar to a fault such as an arc fault condition. The end user (homeowner or electrical contractor) in these cases is left to navigate the entire branch to identify the specific load which may be causing the unwanted tripping or nuisance tripping condition.

Residential fault diagnostics tools are readily available which help the end user ascertain if the fault condition is caused by arc fault or ground fault or overcurrent condition. However in case of the arc fault condition, the residential fault diagnostics tool available as of date have not been able to clearly identify or label the specific residential load which may have caused the unwanted tripping or nuisance tripping condition. By identifying the specific load the end user has a chance of replacing the load with another similar load which may be known to produce less interference to the electronic circuit breaker thereby reducing the frequencies of the unwanted tripping. However, without knowing the exact load, the end user is left to their debugging skills and following branch circuits hidden behind the drywall.

As a result, the end user often is left to spend additional time following the branch originating from the residential power distribution system panel and operating or energizing each residential load within the branch to identify the cause of the unwanted tripping or nuisance tripping. Such an operation is often cumbersome, time consuming and in case of multiple such potential fault causing devices can be incorrect.

Therefore, there is a need for an improved load identification system.

SUMMARY

Briefly described, aspects of the present invention relate to a residential fault diagnostics tool that is able to clearly identify or label the specific residential load which may have caused the unwanted tripping or nuisance tripping condition for the electronic circuit breakers governing the branches. Due to this identification information, the end user have a chance of replacing the load with another similar load which may be known to produce less interference to the electronic circuit breaker thereby reducing the frequencies of the unwanted tripping.

In accordance with one illustrative embodiment of the present invention, a system for identification of loads in a residential branch of electrical circuit including a plurality of electrical outlets is provided. It comprises a residential power distribution panel comprising an electronic circuit breaker connected with the residential branch of electrical circuit such that the residential branch of electrical circuit has multiple connected loads to the plurality of electrical outlets. The electronic circuit breaker may experience unwanted tripping in the residential branch of electrical circuit. The system further comprises a residential fault diagnostics tool connected to the residential branch of electrical circuit via one of outlets of the plurality of electrical outlets. The residential fault diagnostics tool can record, store, experience electrical conditions which are also experienced by the electronic circuit breaker. The system further comprises a communicating device such as a mobile device (e.g., a cell phone or a tablet) running a mobile application (APP) and provides a user interface to display relevant diagnostics information for an end user. The mobile device is configured to be in wireless communication with the residential fault diagnostics tool. The mobile application (APP) includes a classification analyzer for the identification of the loads such that a load that tripped is identified by running a classification analysis by the classification analyzer to derive a likelihood match of the load with a known load. The mobile device can be tailored to receive electrical signals and waveforms on demand when requested by the end user using the mobile device. A decision of the identification is provided on the mobile application (APP).

In accordance with one illustrative embodiment of the present invention, a system for identification of loads in a residential branch of electrical circuit including a plurality of electrical outlets is provided. It comprises a residential power distribution panel comprising an electronic circuit breaker connected with the residential branch of electrical circuit such that the residential branch of electrical circuit has multiple connected loads to the plurality of electrical outlets. The electronic circuit breaker may experience unwanted tripping in the residential branch of electrical circuit. The system further comprises a residential fault diagnostics tool connected to the residential branch of electrical circuit via one of outlets of the plurality of electrical outlets. The residential fault diagnostics tool can record, store, experience electrical conditions which are also experienced by the electronic circuit breaker. The system further comprises a communicating device such as a mobile device (e.g., a cell phone or a tablet) running a mobile application (APP) and provides a user interface to display relevant diagnostics information for an end user. The mobile device is configured to be in wireless communication with the residential fault diagnostics tool. The residential fault diagnostics tool includes a classification analyzer for the identification of the loads such that a load that tripped is identified by running a classification analysis by the classification analyzer to derive a likelihood match of the load with a known load. The residential fault diagnostics tool can be tailored to receive electrical signals and waveforms on demand when requested by the end user using the mobile device. A decision of the identification is provided on the mobile application (APP).

In accordance with one illustrative embodiment of the present invention, a system for identification of loads in a residential branch of electrical circuit including a plurality of electrical outlets is provided. It comprises a residential power distribution panel comprising an electronic circuit breaker connected with the residential branch of electrical circuit such that the residential branch of electrical circuit has multiple connected loads to the plurality of electrical outlets. The electronic circuit breaker may experience unwanted tripping in the residential branch of electrical circuit. The system further comprises a residential fault diagnostics tool connected to the residential branch of electrical circuit via one of outlets of the plurality of electrical outlets, wherein the residential fault diagnostics tool can record, store, experience electrical conditions which are also experienced by the electronic circuit breaker. The system further comprises a communicating device such as a personal computer or a laptop device running an application (APP) and provides a user interface to display relevant diagnostics information for an end user. The communicating device is configured to be in wireless communication with the residential fault diagnostics tool. The personal computer or the laptop device including a classification analyzer for the identification of the loads such that a load that tripped is identified by running a classification analysis by the classification analyzer to derive a likelihood match of the load with a known load. The personal computer or the laptop device can be tailored to receive electrical signals and waveforms on demand when requested by the end user using the communicating device. A decision of the identification is provided on the personal computer or the laptop device.

In accordance with one illustrative embodiment of the present invention, a system for identification of loads in a residential branch of electrical circuit including a plurality of electrical outlets is provided. It comprises a residential power distribution panel comprising an electronic circuit breaker connected with the residential branch of electrical circuit such that the residential branch of electrical circuit has multiple connected loads to the plurality of electrical outlets. The electronic circuit breaker may experience unwanted tripping in the residential branch of electrical circuit. The system further comprises a residential fault diagnostics tool connected to the residential branch of electrical circuit via one of outlets of the plurality of electrical outlets. The residential fault diagnostics tool can record, store, experience electrical conditions which are also experienced by the electronic circuit breaker. The system further comprises a communicating device such as a mobile device (e.g., a cell phone or a tablet) running a mobile application (APP) and provides a user interface to display relevant diagnostics information for an end user. The mobile device is configured to be in communication with the residential fault diagnostics tool. The residential fault diagnostics tool is configured to wirelessly connect to a wireless router or a hot spot and the residential fault diagnostics tool is configured to wirelessly connect to the mobile device. The residential fault diagnostics tool and the mobile application (APP) periodically communicate with a cloud interface or a cloud end point that includes a classification analyzer for the identification of the loads such that a load that tripped is identified by running a classification analysis by the classification analyzer to derive a likelihood match of the load with a known load. The mobile device can be tailored to receive electrical signals and waveforms on demand when requested by the end user using the mobile device. A decision of the identification is provided on the mobile application (APP).

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

FIG. 18 illustrates a fourth system for identification of loads in a residential branch of electrical circuit including a plurality of electrical outlets in accordance with an exemplary embodiment of the present invention.

DETAILED DESCRIPTION

Figure 1:
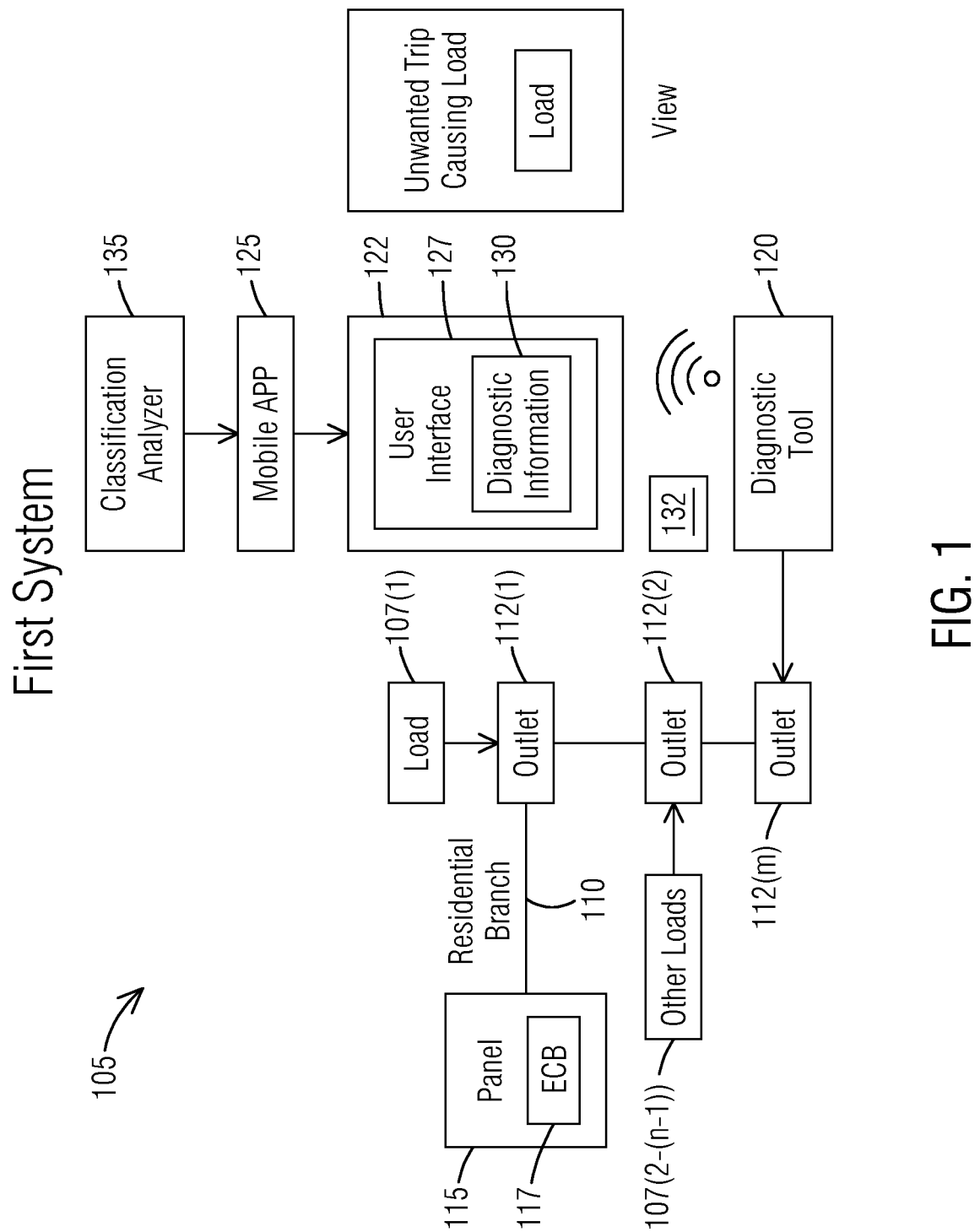
FIG. 1 illustrates a first system for identification of loads in a residential branch of electrical circuit including a plurality of electrical outlets in accordance with an exemplary embodiment of the present invention.

Various technologies that pertain to systems and methods that facilitate a system for identification of loads in a residential branch of electrical circuit including a plurality of electrical outlets will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of a system for identification of loads in a residential branch of electrical circuit including a plurality of electrical outlets. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the system for identification of loads in a residential branch of electrical circuit according to the present disclosure are described below with reference to FIGS. 1-18 herein. Like reference numerals used in the drawings identify similar or identical elements throughout the several views. The drawings are not necessarily drawn to scale.

Consistent with one embodiment of the present invention, FIG. 1 represents a first system 105 for identification of loads 107(1-*n*) in a residential branch 110 of electrical circuit including a plurality of electrical outlets 112(1-*m*) in accordance with an exemplary embodiment of the present invention. The first system 105 comprises a residential power distribution panel 115 comprising an electronic circuit breaker 117 connected with the residential branch 110 of electrical circuit such that the residential branch 110 of electrical circuit has multiple connected loads 107(1-*n*) to the plurality of electrical outlets 112(1-*m*). The electronic circuit breaker 117 may experience unwanted tripping in the residential branch 110 of electrical circuit.

The first system 105 further comprises a residential fault diagnostics tool 120 connected to the residential branch 110 of electrical circuit via one of outlets of the plurality of electrical outlets 112(1-*m*). The residential fault diagnostics tool 120 can record, store, experience electrical conditions which are also experienced by the electronic circuit breaker 117. The first system 105 further comprises a communicating device 122 such as a mobile device (e.g., a cell phone or a tablet) running a mobile application (APP) 125 and provides a user interface 127 to display relevant diagnostics information 130 for an end user 132.

The mobile device 122 is configured to be in wireless communication with the residential fault diagnostics tool 120. The mobile application (APP) 125 includes a classification analyzer 135 for the identification of the loads 107 (1-*n*) such that a load that tripped is identified by running a classification analysis by the classification analyzer 135 to derive a likelihood match of the load with a known load. The mobile device 122 can be tailored to receive electrical signals and waveforms on demand when requested by the end user 132 using the mobile device 122. In operation, a decision of the identification is provided on the mobile application (APP) 125 in this embodiment.

The residential fault diagnostics tool 120 and the mobile application (APP) 125 when encountered with an unknown load can be updated with a newer firmware or a newer mobile application. The newer firmware or the newer mobile application (APP) are a result of a retrained neural network model or a machine learning model resulting from receiving information related to a troublesome load and signals/waveforms of the troublesome load.

The residential fault diagnostics tool 120 can provide a means to charge the mobile device 122 during the duration of a troubleshooting exercise through a known wired means. The residential fault diagnostics tool 120 can alternately provide a means to charge the mobile device 122 during the duration of the troubleshooting exercise through a known wireless charging interface.

A residential fault diagnostics tool available as of date have not been able to clearly identify or label the specific residential load which may have caused the unwanted tripping or nuisance tripping condition for the electronic circuit breakers governing the said branches. Due to this lack of information, the end user does not have a chance of replacing the load with another similar load which may be known to produce less interference to the electronic circuit breaker thereby reducing the frequencies of the unwanted tripping.

This specific invention starts out to identify methods to resolve the above problem by providing a method to identify the load. In the context of this discussion, the electronic circuit breaker is primarily pointing towards the electronic arc fault circuit interrupters (AFCIs). The electronic AFCIs are typically populated in most household residential power distribution panel.

Figure 2:
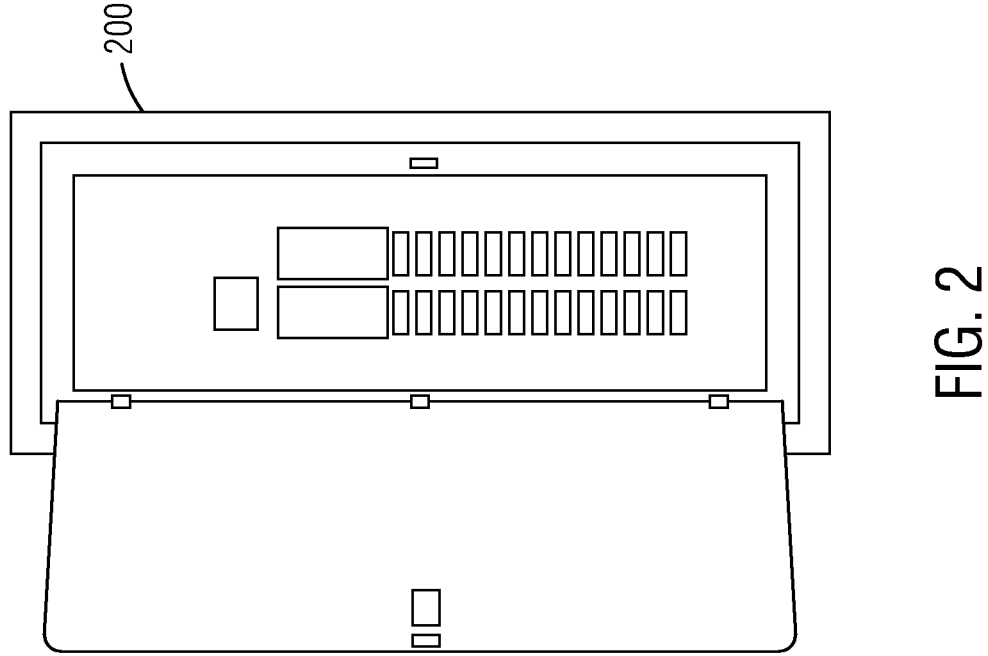
FIG. 2 illustrates a residential power distribution panel in accordance with an exemplary embodiment of the present invention.

Referring to FIG. 2, it shows an example of a residential power distribution panel 200. FIG. 2 illustrates the residential power distribution panel 200 in accordance with an exemplary embodiment of the present invention.

Figure 3:
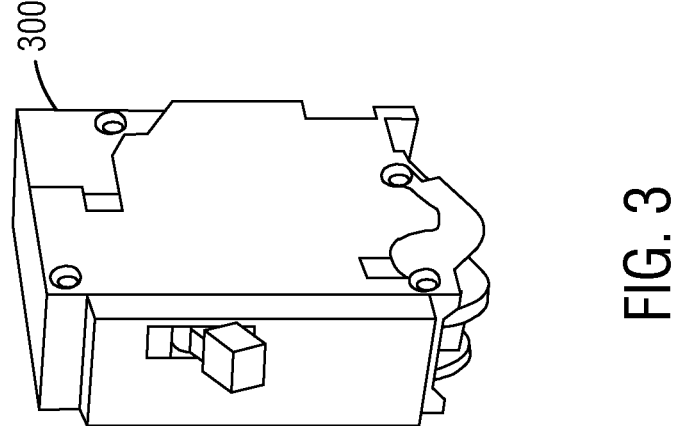
FIG. 3 illustrates an electronic arc fault circuit interrupter in accordance with an exemplary embodiment of the present invention.

Turning now to FIG. 3, it illustrates an electronic arc fault circuit interrupter (AFCI) 300 in accordance with an exemplary embodiment of the present invention. FIG. 3 shows an example of the electronic arc fault circuit interrupter (AFCI) 300 that are typically populated in the residential power distribution panel 200.

These electronic AFCI devices provide electronic arc fault detection and protection based on the detection. The US patent entitled "Arc Fault Circuit Detection Methods, Systems and Apparatus including delay", Patent No: U.S. Pat. No. 8,929,036 B2, Date of Patent: Jan. 6, 2015, to Nayak et al. claims an electronic arc fault detection which comprises of a housing containing a system with a microprocessor driven design.

Figure 4:
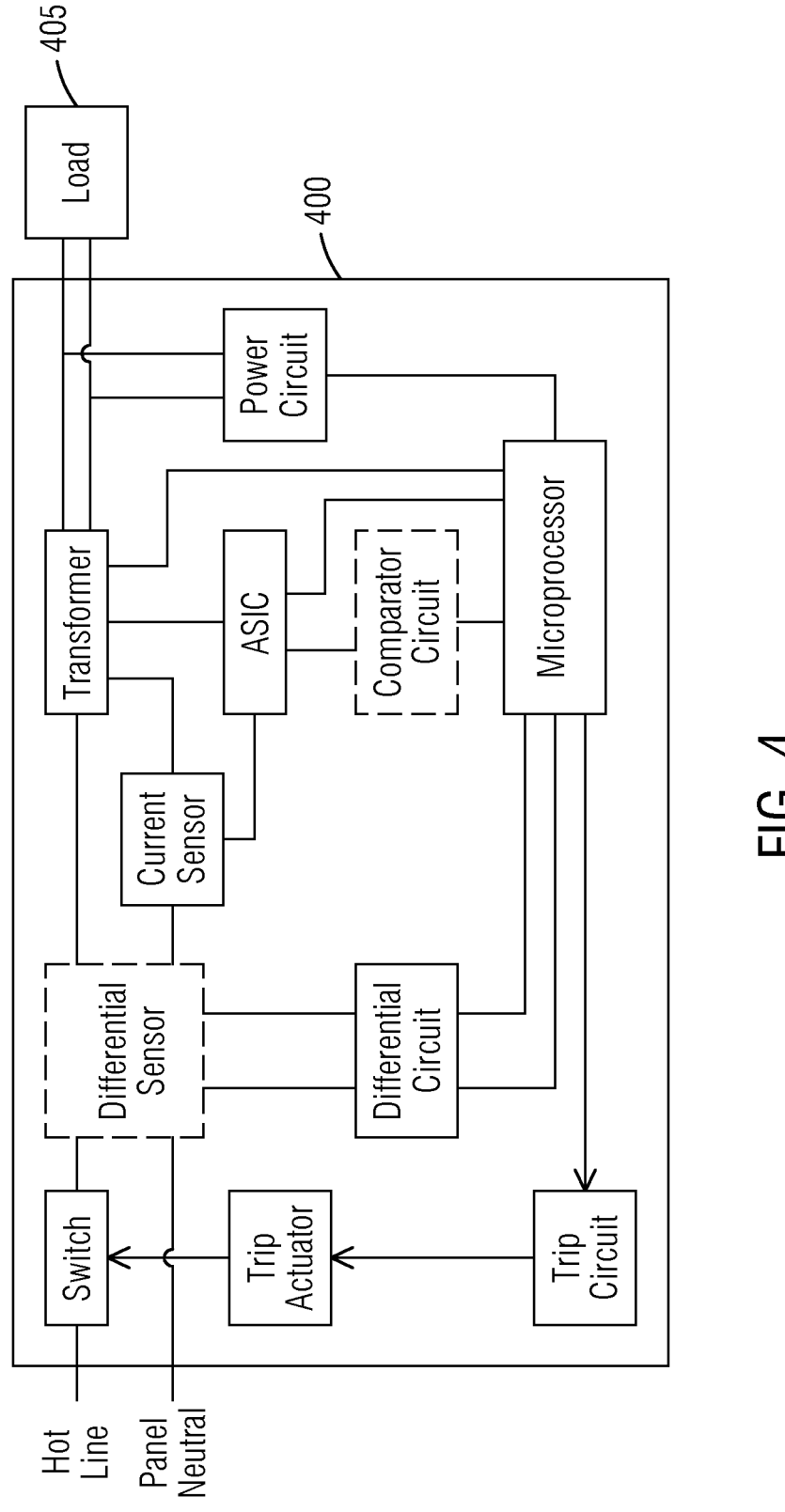
FIG. 4 illustrates electronic arc fault detection (Circuit Breaker) housing with panel and load connections on either side in accordance with an exemplary embodiment of the present invention.

FIG. 4 illustrates electronic arc fault detection (Circuit Breaker) housing 400 with panel and load connections on either side in accordance with an exemplary embodiment of the present invention. The FIG. 4 shows this housing with connections to the panel 200 and a load 405.

Figures 5, 6:
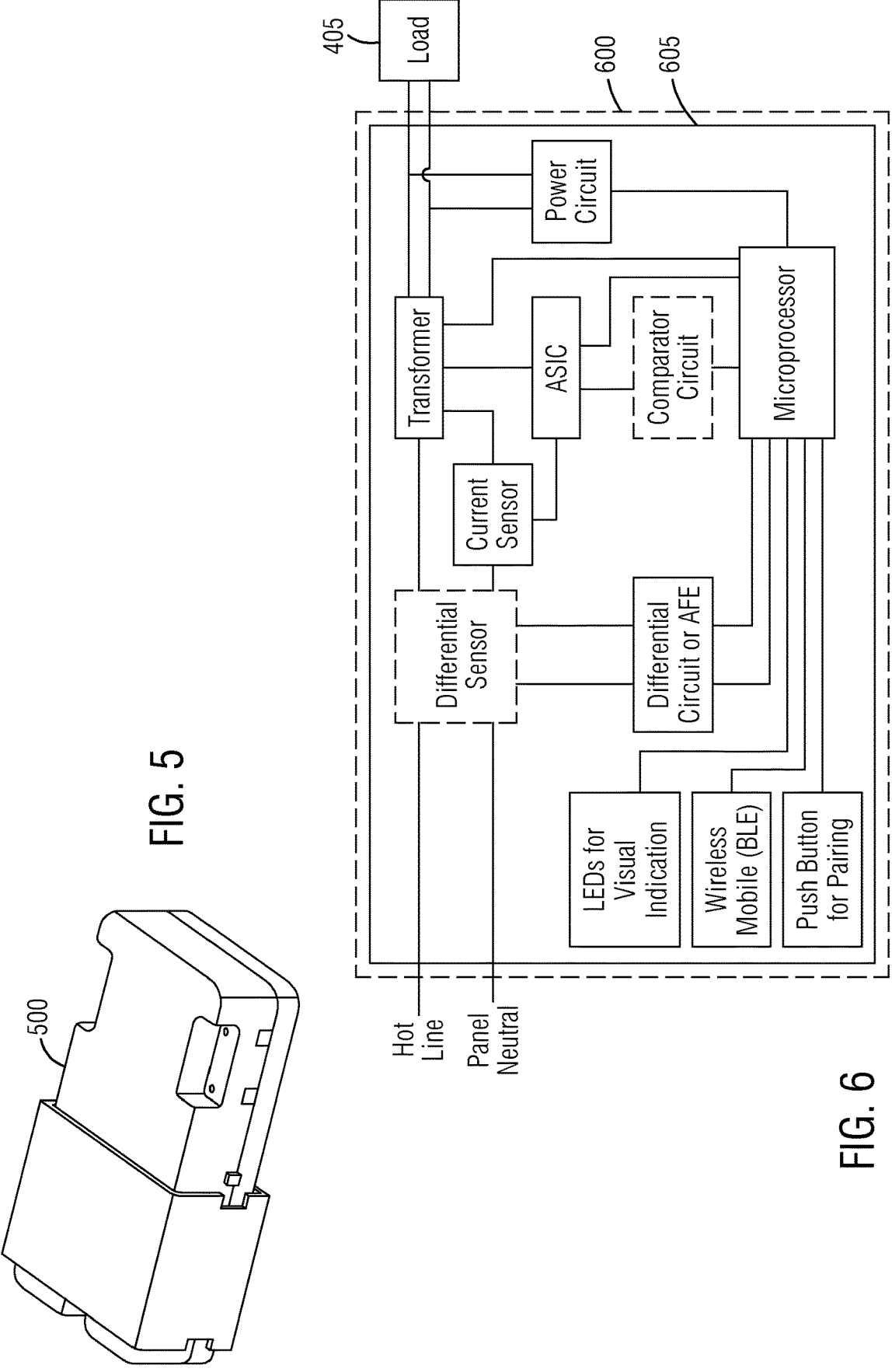
FIG. 5 illustrates a residential fault diagnostics tool in accordance with an exemplary embodiment of the present invention.
FIG. 6 illustrates a block diagram of a residential fault diagnostics tool in accordance with an exemplary embodiment of the present invention.

As seen in FIG. 5, it illustrates a residential fault diagnostics tool 500 in accordance with an exemplary embodiment of the present invention. The residential fault diagnostics tool 500 is essentially a similar fault detection system without the ability to performing a tripping mechanism. In FIG. 5, an example rendition of the residential fault diagnostics tool 500 is shown.

As shown in FIG. 6, it illustrates a block diagram 600 of the residential fault diagnostics tool 500 in accordance with an exemplary embodiment of the present invention. In one embodiment of the application of the residential fault diagnostics tool 500, a housing 605 contains most of the block diagram 600 from the circuit breaker but without the tripping mechanism including the trip circuit removed. FIG. 6 shows this housing 605 in detail. All the other blocks from the electronic circuit breaker are reused. In addition, there are several user interfaces, features for LED and a push button for initiating the pairing of the device through the Bluetooth Low Energy (BLE) wireless protocol. Further a separate wireless module for facilitating the BLE communication is available.

Figure 7:
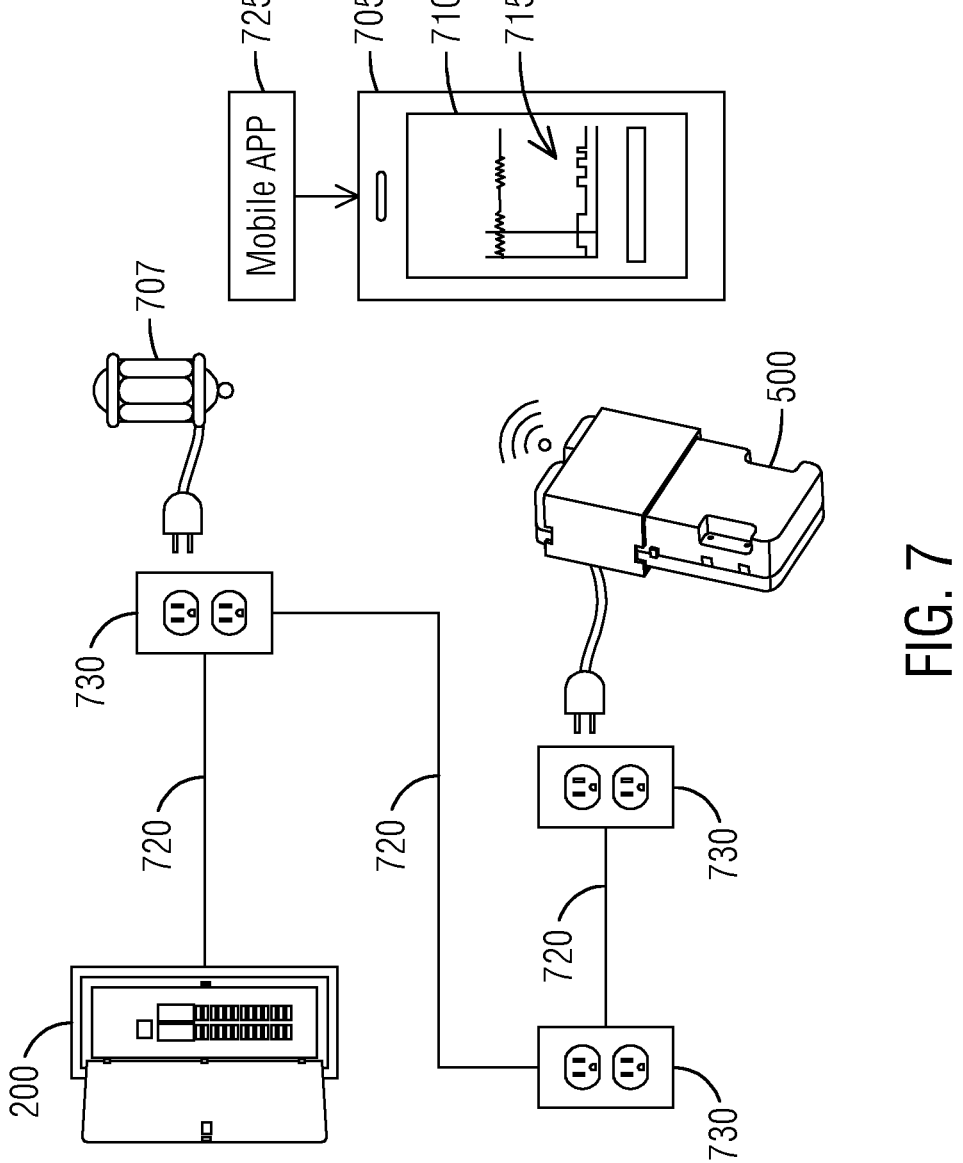
FIG. 7 illustrates a typical use case showing the residential fault diagnostics tool in operation in accordance with an exemplary embodiment of the present invention.

In FIG. 7, it illustrates a typical use case showing the residential fault diagnostics tool 500 in operation in accordance with an exemplary embodiment of the present invention.

The residential fault diagnostics tool 500 is to be used in conjunction and communicates with a mobile device 705 running a mobile application (APP) 725 to provide a user interface 710, visual display and relevant diagnostics information 715 for the end user. In a use case defining typical application, the residential power distribution panel 200 comprising of an electronic circuit breaker will be connected with a branch 720 of electrical circuit. This branch 720 of electrical circuit can have multiple connected loads 707.

In one of the available receptacle or outlets 730 connected on the branch 720, the residential fault diagnostics tool 500 shall be connected to the branch 720. The residential fault diagnostics tool 500 shall communicate with the mobile device 705 to provide additional information related to the conditions experienced by the specific branch 720. In FIG. 7, a typical use case showing such a wiring example is shown with loads 707 connected to outlets 730 and the residential fault diagnostics tool 500 connected to one of the available outlets 730.

Figure 8:
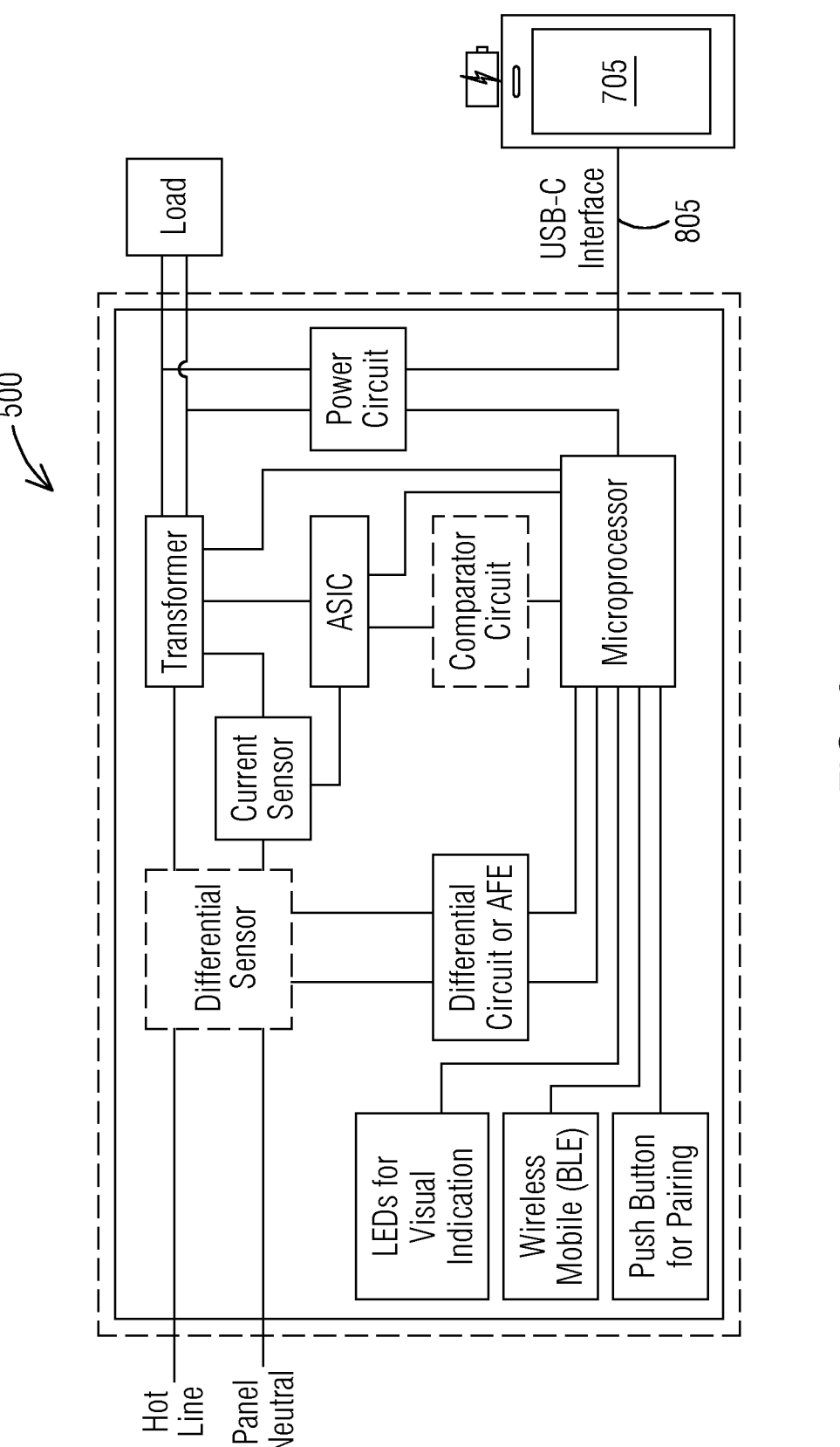
FIG. 8 illustrates one scenario of charging capability of an external mobile device from the residential fault diagnostics tool using wired USB connection in accordance with an exemplary embodiment of the present invention.

With regard to FIG. 8, it illustrates one scenario of charging capability of an external mobile device from the residential fault diagnostics tool 500 using a wired USB connection 805 in accordance with an exemplary embodiment of the present invention. In one of the embodiments of the residential fault diagnostics tool 500, an additional feature in the form of charging capability of the mobile device 705 is provided to the end user's advantage. In this particular scenario, the end user can wirelessly connect to the tool 500 and also receive charging power from the tool 500.

Figure 9:
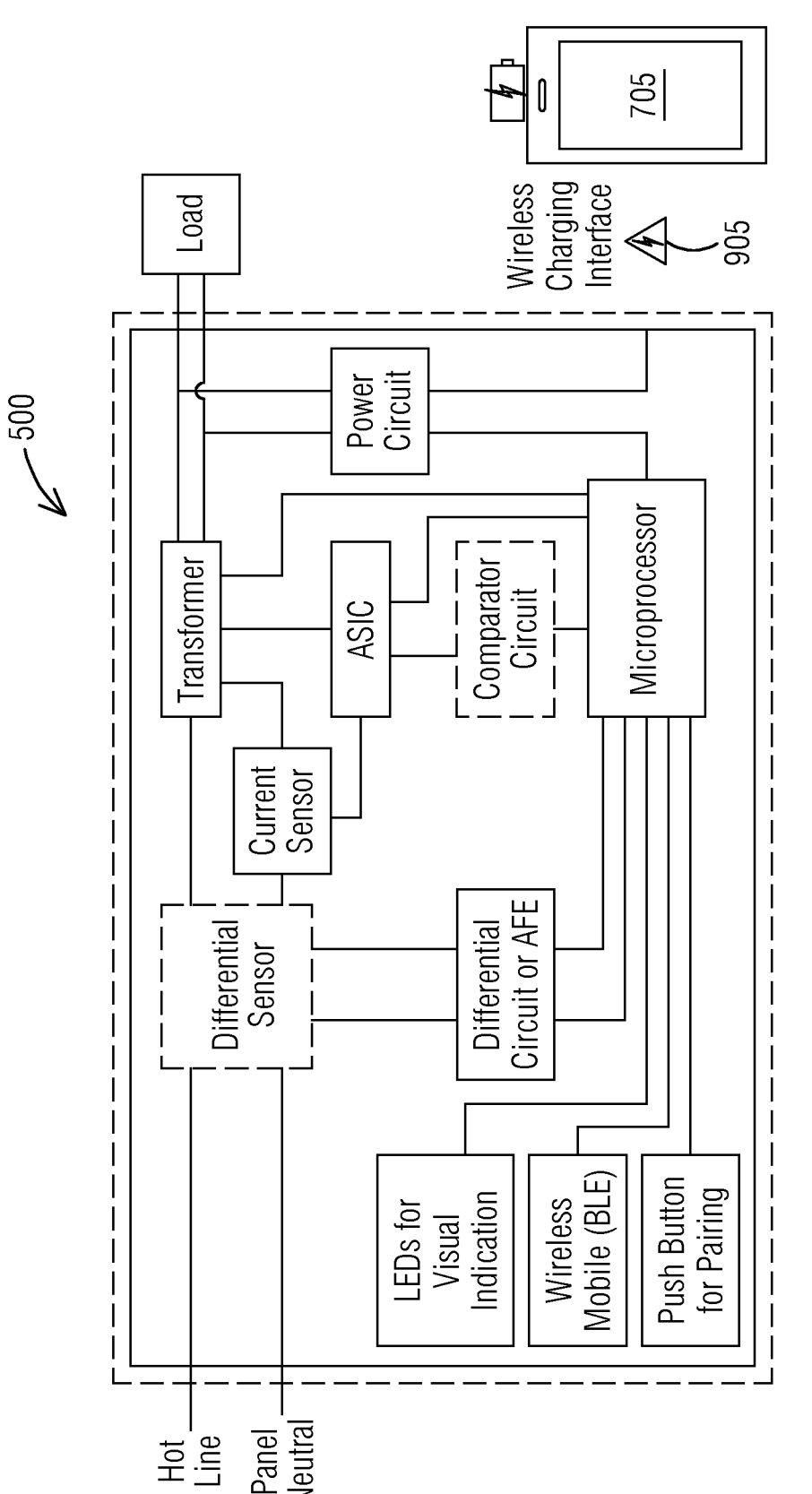
FIG. 9 illustrates another scenario of charging capability of an external mobile device from the residential fault diagnostics tool using wireless charging interface in accordance with an exemplary embodiment of the present invention.

With respect to FIG. 9, it illustrates another scenario of charging capability of an external mobile device from the residential fault diagnostics tool 500 using a wireless charging interface in accordance with an exemplary embodiment of the present invention. In FIG. 9, another specific scenario showing the example of charging capability of the mobile device 705 using the residential fault diagnostics tool 500 using a wireless charging interface 905 is described. The wireless charging interface 905 for the charging can be like the inductive charging as a type of wireless power transfer. This technology uses electromagnetic induction to provide electricity to portable devices.

The invention for identifying the load, involves an application use case like the FIG. 7. A residential load panel consists of electronic circuit breakers which may experience unwanted tripping in a specific residential electrical branch. In this embodiment of the invention, it is assumed that multiple loads are connected in various available outlets of the electrical branch. In one of the branch outlets, LED light loads are connected which are known to cause the electronic circuit breakers connected on the branch to cause unwanted tripping. To troubleshoot in this scenario, the end user (homeowner or the electrical contractor) shall use the residential fault diagnostics tool 500 which is connected to one of the available branch outlets. The residential fault diagnostics tool 500 can record, store, experience the electrical conditions which are also experienced by the electronic circuit breaker.

In addition, the residential fault diagnostics tool 500 can wirelessly connect through commonly available protocols such as Bluetooth Low Energy means to connect to an available mobile device which runs the same protocol as a server. An application running on the mobile device 705 can be tailored to receive the electrical signals and waveforms on demand when requested by the user using the mobile device 705.

Figure 10:
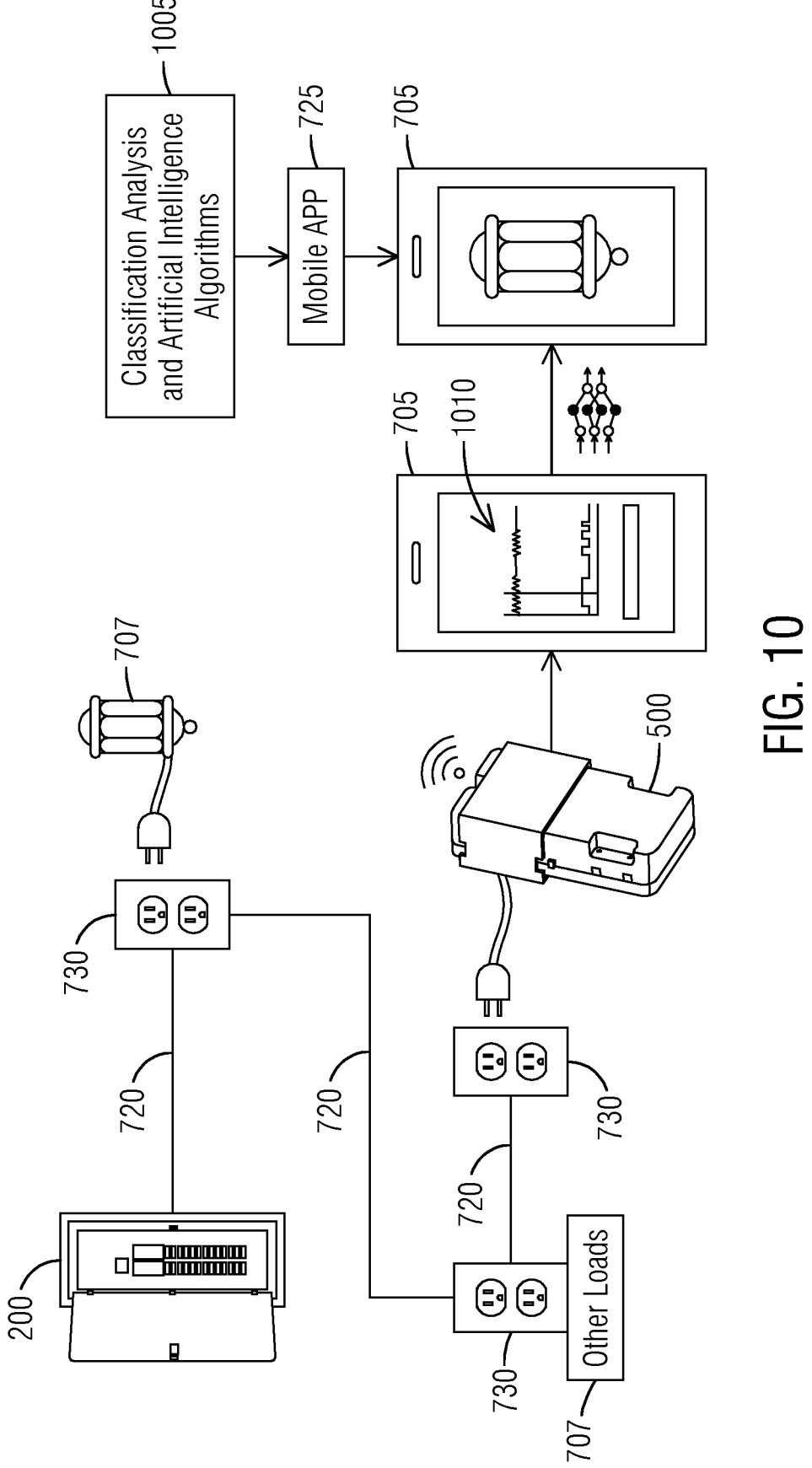
FIG. 10 illustrates a method of identifying load using the residential fault diagnostics tool and a mobile device where analysis is done in the mobile device in accordance with an exemplary embodiment of the present invention.

FIG. 10 illustrates a method of identifying load using the residential fault diagnostics tool 500 and the mobile device 705 where analysis is done in the mobile device 705 in accordance with an exemplary embodiment of the present invention. This is one of the embodiments of the invention. In this embodiment, the mobile device 705 such as a cellular phone or a tablet running a specialized application, receives the signals and waveforms from the diagnostics tool 500. Classification analysis and artificial intelligence algorithms 1005 reside in the mobile application 725. The end user can, on further interest, interact through the mobile application 725 to perform additional analysis of signals and waveforms 1010.

When pursued by the end user, the analysis of the signals and waveforms 1010 is conducted by the classification using neural network algorithms 1005, which shall result in a view of the mobile application 725 showing an unwanted trip causing load. The view shows the highest likelihood of the load that matches with the recorded/received waveforms. The view also shows the other likelihood of the loads 707 that may have a closer match but are at a lower priority.

In another embodiment of the invention, the classification analysis considered the main interest of this invention may reside in the residential fault diagnostics tool 500 itself.

Figure 11:
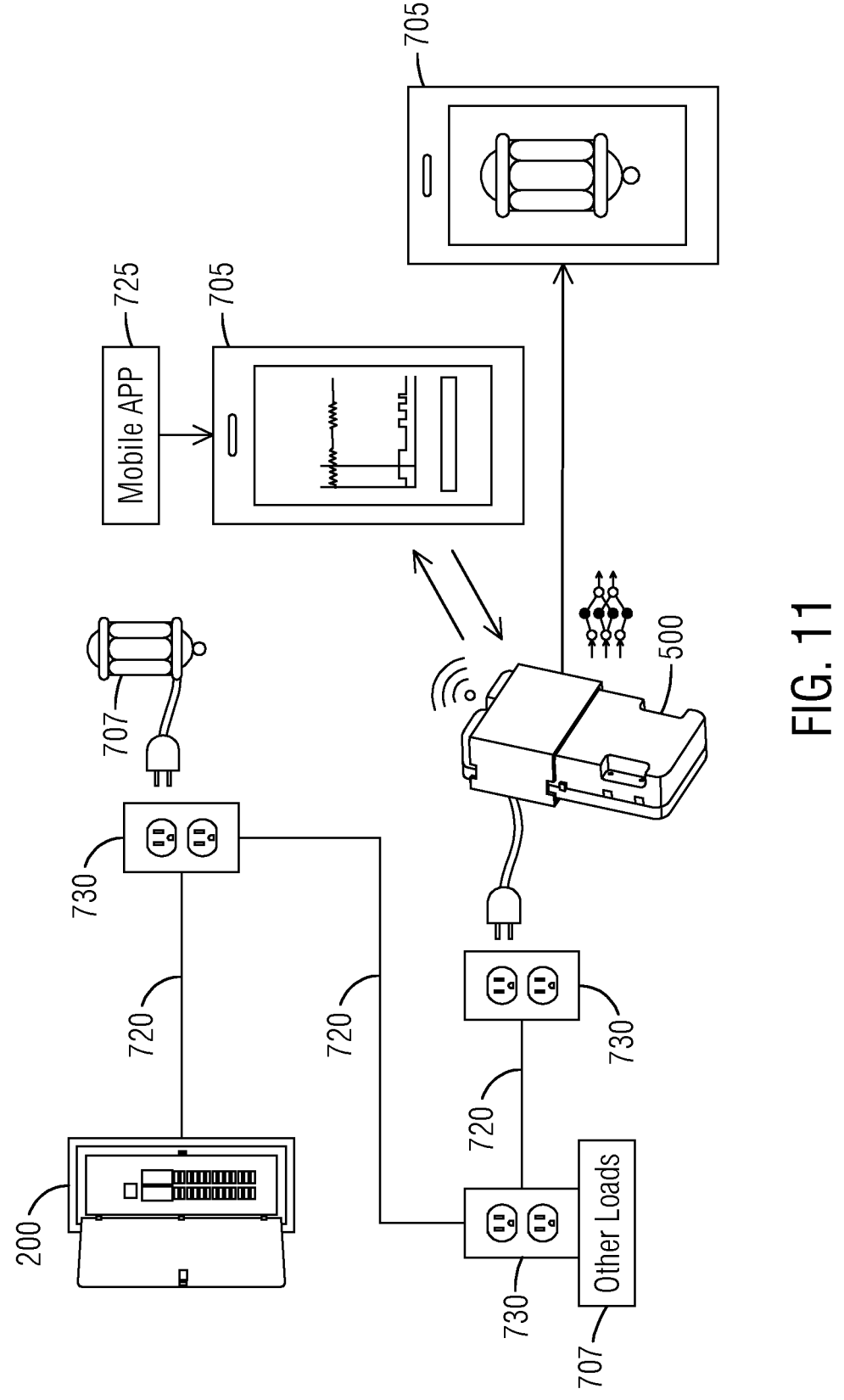
FIG. 11 illustrates a method of identifying load using the residential fault diagnostics tool and a mobile device where analysis is done in the residential fault diagnostics tool in accordance with an exemplary embodiment of the present invention.

FIG. 11 illustrates a method of identifying a load 707 using the residential fault diagnostics tool 500 and the mobile device 705 where analysis is done in the residential fault diagnostics tool 500 itself in accordance with an exemplary embodiment of the present invention. FIG. 11 shows another example of a method of identifying the load 707 using the residential fault diagnostics tool 500 and the mobile device 705 such as a cellular device running the specialized application 725. In this example, the classification analysis is done in the residential fault diagnostics tool 500. The mobile application 725 is only performing the activity of wirelessly communicating with the residential fault diagnostics tool 500 to receive the information to share with the end user.

Figure 12:
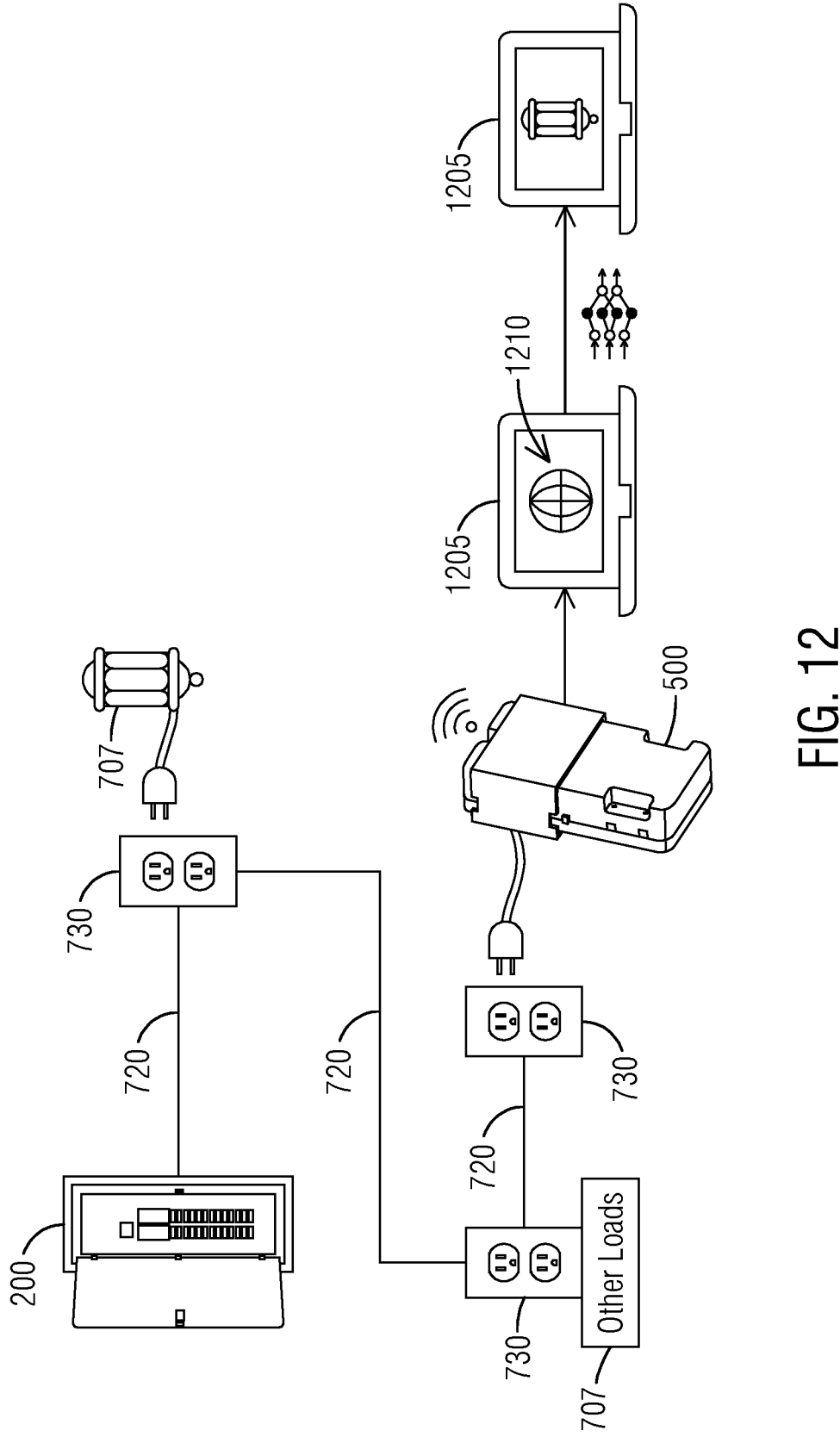
FIG. 12 illustrates a method of identifying load using the residential fault diagnostics tool and a mobile device where the mobile device can be a personal laptop such that the analysis is done in the personal laptop in accordance with an exemplary embodiment of the present invention.

FIG. 12 illustrates a method of identifying a load 707 using the residential fault diagnostics tool 500 and a mobile device where the mobile device can be a personal laptop such that the analysis is done in the personal laptop in accordance with an exemplary embodiment of the present invention. The mobile device 705 used to receive the information can be a personal computer or a personal laptop device 1205. This example is shown in FIG. 12. In another embodiment of the invention, the classification analysis is performed in the personal computer/personal laptop device 1205 and a display interface for an end user is also the same device namely the personal computer/personal laptop device 1205. A special application running on the personal computer or personal laptop device 1205 can facilitate the receipt of the signals/waveforms 1210 and also a decision as a result of the classification analysis.

The advantage of performing the classification analysis in the personal computer/personal laptop device 1205 is that the memory available in these devices typically tend to be larger than the memory feasible in a cellular phone. Similarly the residential fault diagnostics tool 500 though running a microcontroller to facilitate the operation, typically tends to have lesser memory than those available in the personal computer/personal laptop device 1205.

The classification analysis is further described in the below figure. While for example the classification analysis is shown here it is assumed a similar analysis is present in other embodiments of this invention.

Figure 13:
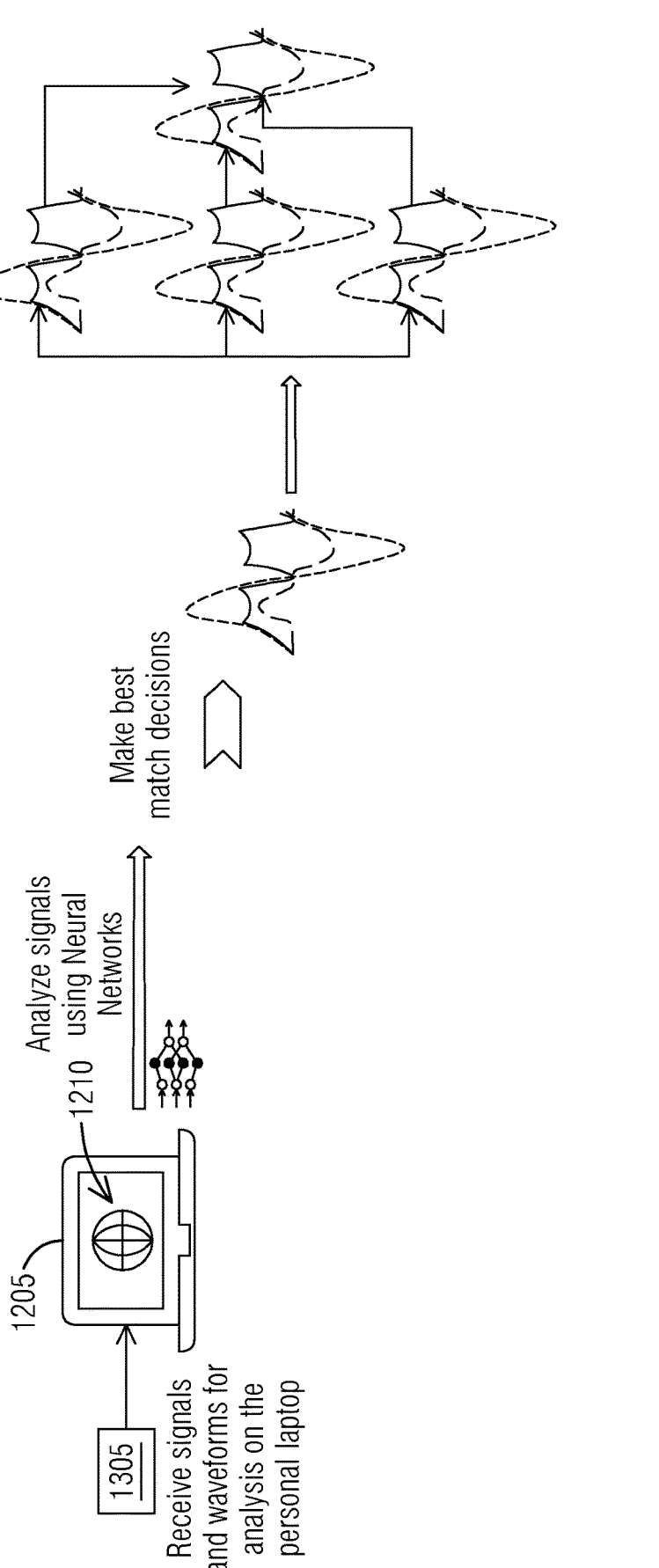
FIG. 13 illustrates an example of classification analysis in accordance with an exemplary embodiment of the present invention.

FIG. 13 illustrates an example of a classification analysis 1305 in accordance with an exemplary embodiment of the present invention. The classification analysis 1305 shown in FIG. 13 is present in the personal computer/personal laptop device 1205. The personal computer/personal laptop device 1205 receives the signals and waveforms 1210 for analysis from the residential fault diagnostics tool 500. Typical examples of signals and waveforms 1210 identified as input load waveforms used in this analysis can be load current (I), RF component (RSSI), and Line Voltage (V) among other parameters.

The input load waveforms 1210 are processed and classified using neural networks and compared with previously saved waveform profiles to match the closeness of the input load waveforms to various known load waveforms.

During the classification analysis 1305, depending on the saved waveforms, of various loads, the comparison could be performed over all the signals and waveforms 1210. The result of the classification analysis 1305 is the best match or closeness of the input waveform with a known load waveform or signal conditions.

The best match decision provides the most likelihood or percentage of closeness with the most likely load. This information is provided through the visual display interface on the end customer facing entity. In this above example as shown in FIG. 13, this is provided on the personal computer/personal laptop device 1205.

In another embodiment of the invention, a classification analysis can reside in a cloud instance and periodically communicate with a mobile cellular application running on a mobile device.

Figure 14:
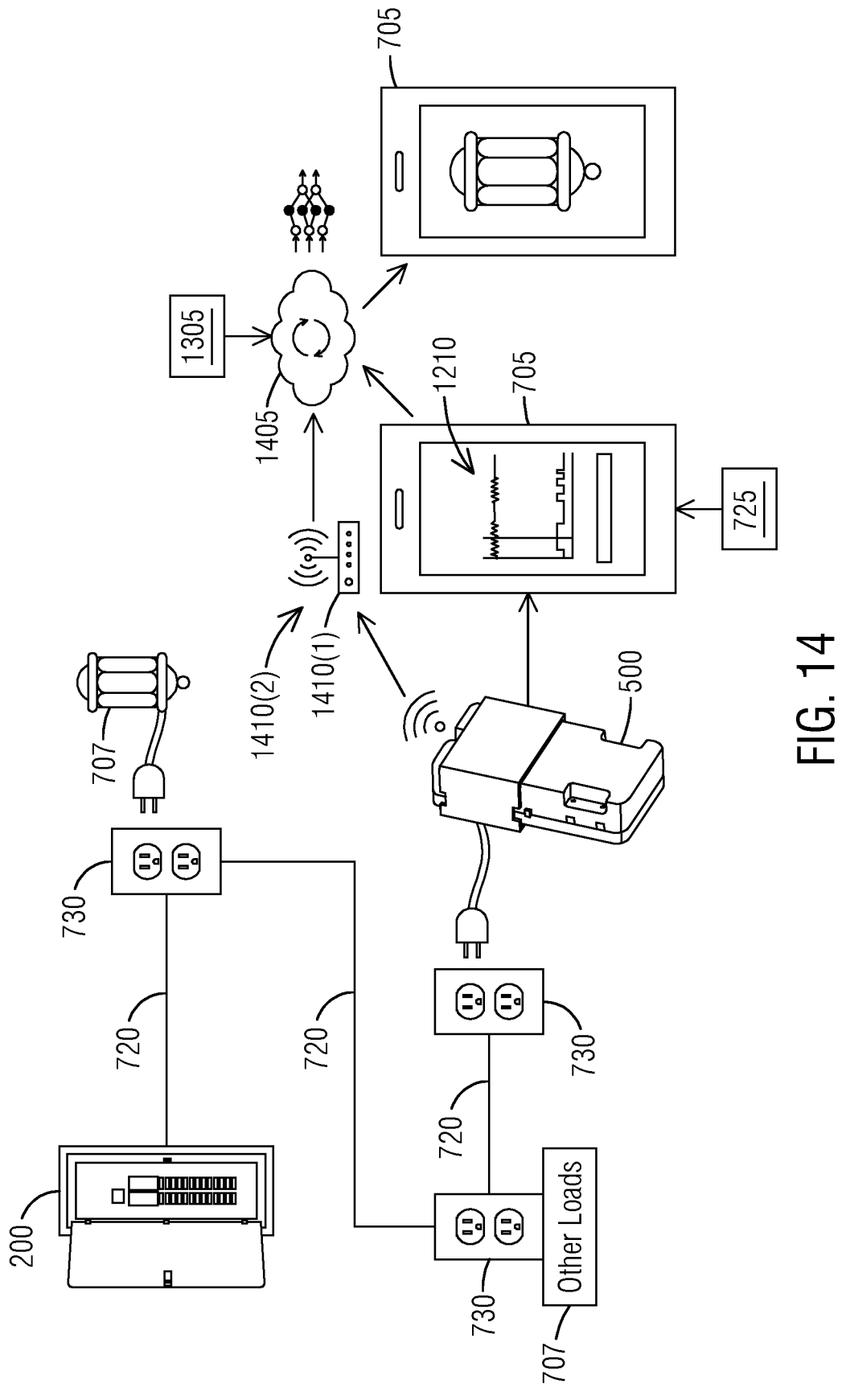
FIG. 14 illustrates a method of identifying load using the residential fault diagnostics tool and a mobile device where the analysis is done in a cloud instance and notifications pushed back to the mobile device in accordance with an exemplary embodiment of the present invention.

FIG. 14 illustrates a method of identifying a load 707 using the residential fault diagnostics tool 500 and the mobile device 705 where the classification analysis 1305 is done in a cloud instance 1405 and notifications pushed back to the mobile device 705 in accordance with an exemplary embodiment of the present invention. In FIG. 14, a method is shown where the residential fault diagnostics tool 500 connects wirelessly with a wireless router 1410(1) or a wireless hot spot 1410(2). Further the data from the wireless router 1410(1) or the wireless hot spot 1410(2) is directed to a dedicated cloud end point where analysis of received signals and waveforms 1210 can be performed using neural networks.

Alternately, the mobile device 705 wirelessly connects with the residential fault diagnostics tool 500 and the mobile cellular application 725 periodically or on demand pushes the signals to the cloud end point. The classification analysis 1305 is performed in the cloud interface 1405 or end point. At the end of the classification analysis 1305 a decision related to the best match or likelihood of the load 707 is sent back as push notification to the mobile cellular application 725.

Occasionally there will be loads encountered which cannot be analyzed with certainty or does not provide any significant likelihood of match with known loads. In these circumstances, it is necessary to obtain the details of the necessary load and update the neural network models or machine learning models to help the device better recognize the similar loads in the field in future.

Figure 15:
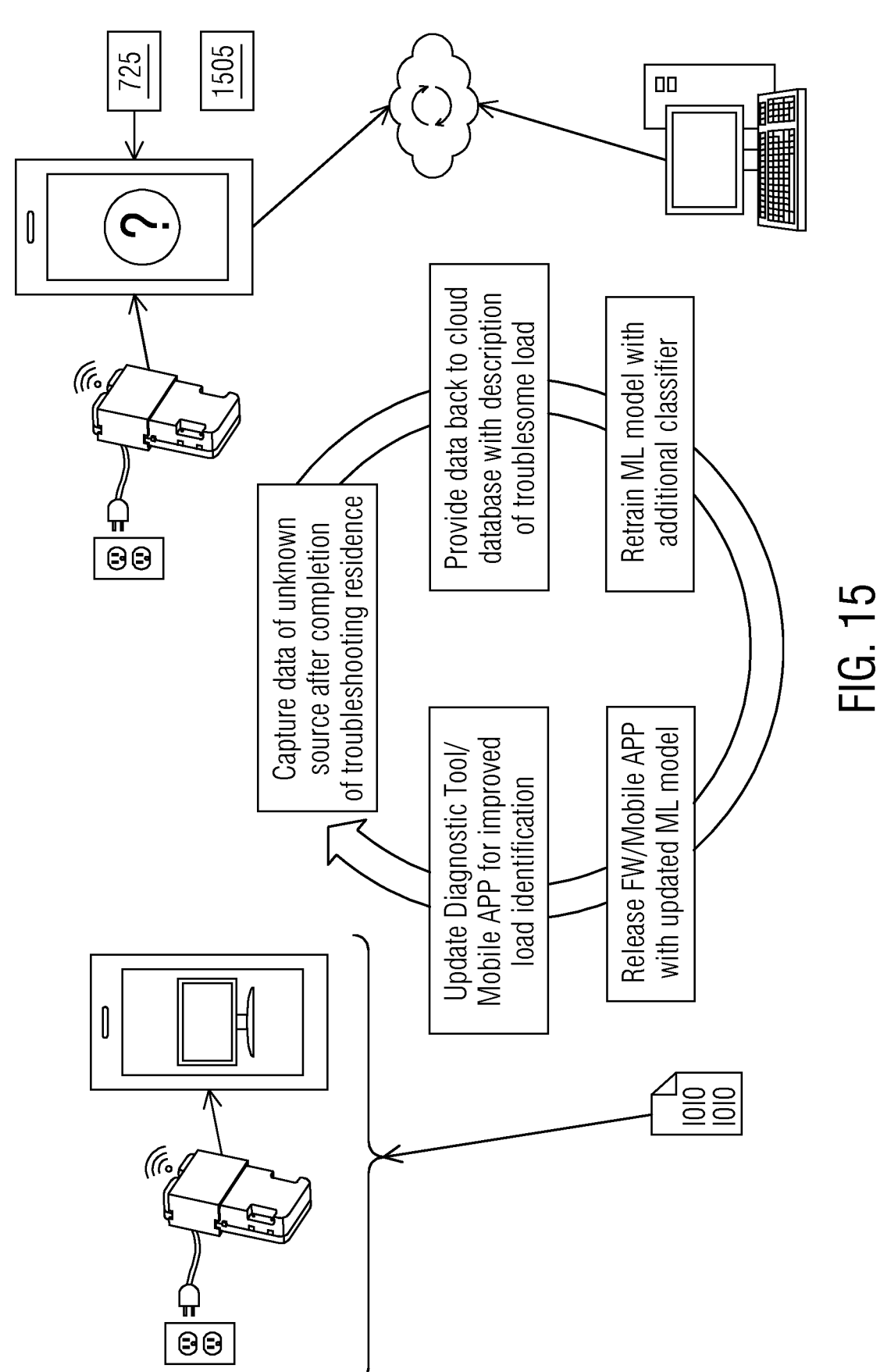
FIG. 15 illustrates a diagnostics tool firmware update loop in accordance with an exemplary embodiment of the present invention.

FIG. 15 illustrates a diagnostics tool firmware update loop in accordance with an exemplary embodiment of the present invention. In the FIG. 15 shown is a method to periodically update the diagnostics tool 500 embedded software or firmware 1505 and potentially also the mobile cellular application 725 with improvements which help the system to retain its efficiency in identifying the loads 707.

When the residential fault diagnostics tool 500 encounters or captures data which on analysis does not result with a high degree of certainty any known loads or the likelihood of match with known loads is not found, data of the unknown load is captured during the troubleshooting process. The data is recovered in an engineering environment. This could be performed using the cloud interface 1405 to add to a database with description of potential troublesome loads.

The neural network models or machine learning models are retrained with additional classifiers to create an update. Depending on the embodiment of the invention the classification analysis 1305 is then upgraded. This may mean that the firmware 1505 of the residential fault diagnostics tool 500 is updated with a newer machine learning model, or the mobile application 725 is updated with a newer machine learning model. The updated diagnostic tool or the updated mobile application is now able to successfully provide improved load identification.

Figure 16:
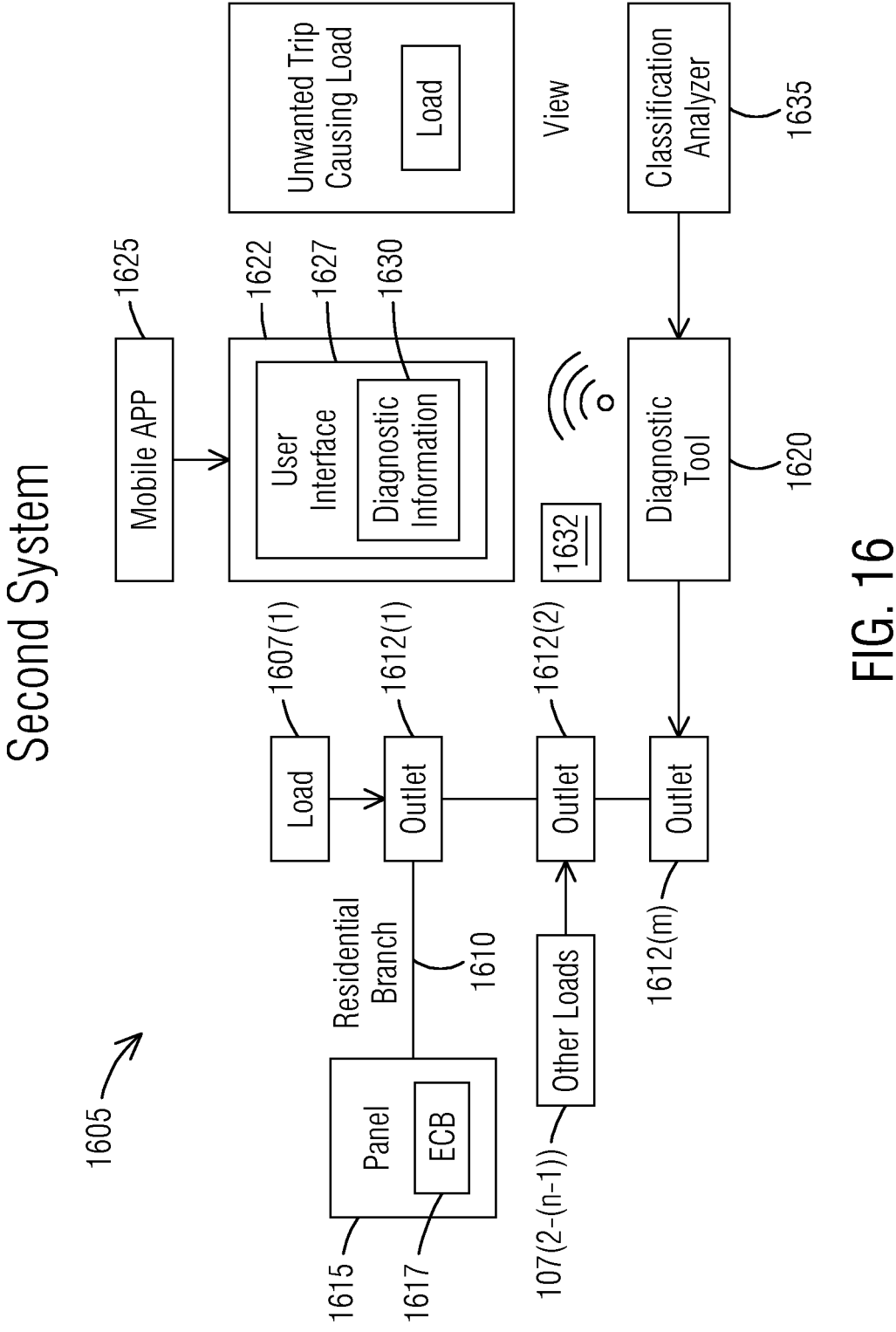
FIG. 16 illustrates a second system for identification of loads in a residential branch of electrical circuit including a plurality of electrical outlets in accordance with an exemplary embodiment of the present invention.

FIG. 16 illustrates a second system 1605 for identification of loads 1607(1-n) in a residential branch 1610 of electrical circuit including a plurality of electrical outlets 1612(1-m) in accordance with an exemplary embodiment of the present invention. The second system 1605 comprises a residential power distribution panel 1615 comprising an electronic circuit breaker 1617 connected with the residential branch 1610 of electrical circuit such that the residential branch 1610 of electrical circuit has multiple connected loads 1607(1-*n*) to the plurality of electrical outlets 1612(1-*m*). The electronic circuit breaker 1617 may experience unwanted tripping in the residential branch 1610 of electrical circuit.

The second system 1605 further comprises a residential fault diagnostics tool 1620 connected to the residential branch 1610 of electrical circuit via one of outlets of the plurality of electrical outlets 1612(1-*m*). The residential fault diagnostics tool 1620 can record, store, experience electrical conditions which are also experienced by the electronic circuit breaker 1617. The second system 1605 further comprises a communicating device 1622 such as a mobile device (e.g., a cell phone or a tablet) running a mobile application (APP) 1625 and provides a user interface 1627 to display relevant diagnostics information 1630 for an end user 1632.

The mobile device 1622 is configured to be in wireless communication with the residential fault diagnostics tool 1620. The residential fault diagnostics tool 1620 includes a classification analyzer 1635 for the identification of the loads 1607(1-*n*) such that a load that tripped is identified by running a classification analysis by the classification analyzer 1635 to derive a likelihood match of the load with a known load. The residential fault diagnostics tool 1620 can be tailored to receive electrical signals and waveforms 1630 on demand when requested by the end user 1632 using the mobile device 1622. In operation, a decision of the identification is provided on the mobile application (APP) 1625 in this embodiment.

The residential fault diagnostics tool 1620 and the mobile application (APP) 1625 when encountered with an unknown load can be updated with a newer firmware or a newer mobile application (APP). The newer firmware or the newer mobile application (APP) are a result of a retrained neural network model or a machine learning model resulting from receiving information related to a troublesome load and signals/waveforms of the troublesome load.

The residential fault diagnostics tool 1620 can provide a means to charge the mobile device 1622 during the duration of a troubleshooting exercise through a conventional wired means. The residential fault diagnostics tool 1620 can alternately provide a means to charge the mobile device 1622 during the duration of the troubleshooting exercise through a conventional wireless charging interface.

Figure 17:
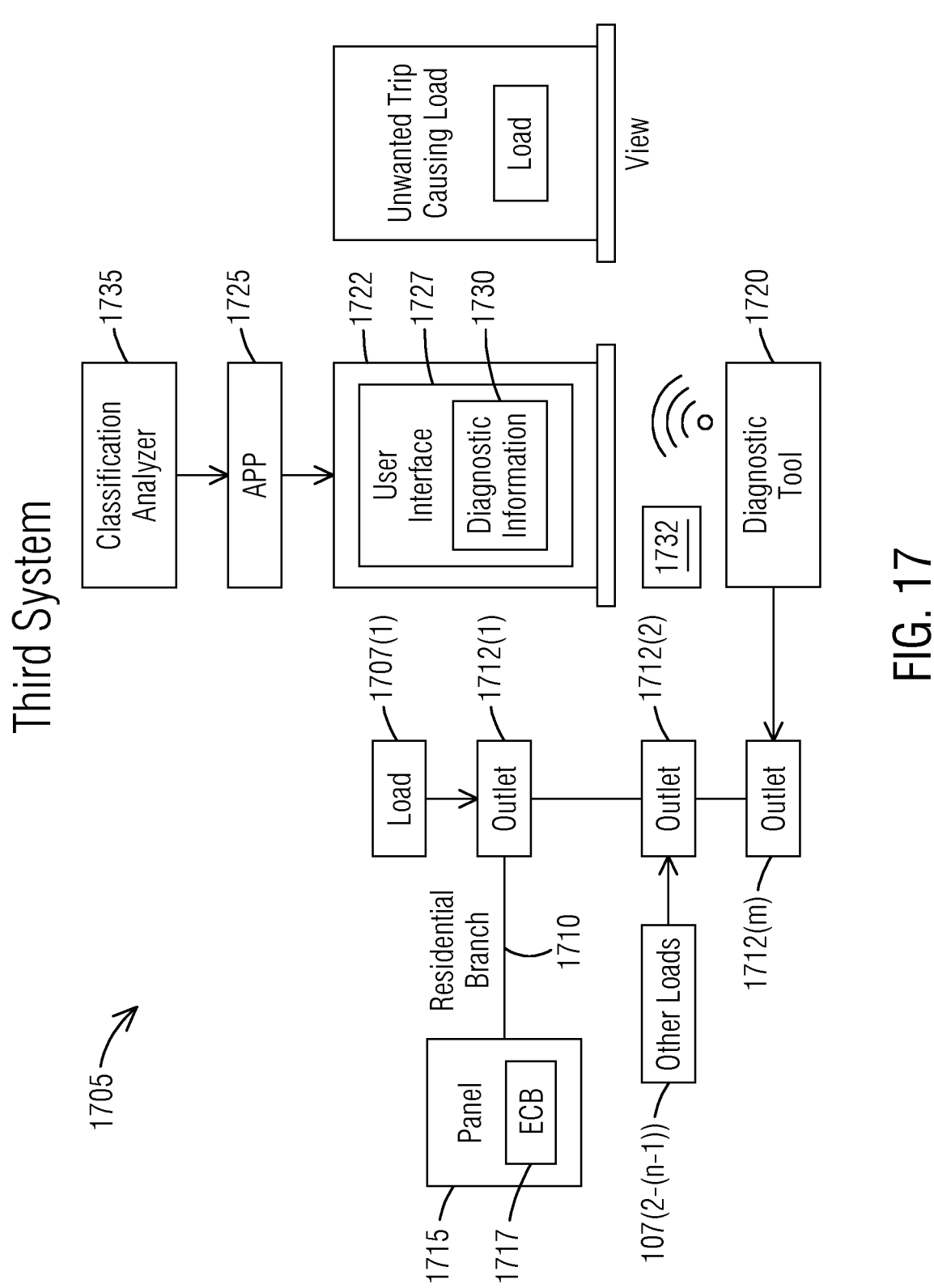
FIG. 17 illustrates a third system for identification of loads in a residential branch of electrical circuit including a plurality of electrical outlets in accordance with an exemplary embodiment of the present invention.

FIG. 17 illustrates a third system 1705 for identification of loads 1707(1-*n*) in a residential branch 1710 of electrical circuit including a plurality of electrical outlets 1712(1-*m*) in accordance with an exemplary embodiment of the present invention. The third system 1705 comprises a residential power distribution panel 1715 comprising an electronic circuit breaker 1717 connected with the residential branch 1710 of electrical circuit such that the residential branch 1710 of electrical circuit has multiple connected loads 1707(1-*n*) to the plurality of electrical outlets 1712(1-*m*). The electronic circuit breaker 1717 may experience unwanted tripping in the residential branch 1710 of electrical circuit. The third system 1705 further comprises a residential fault diagnostics tool 1720 connected to the residential branch 1710 of electrical circuit via one of outlets of the plurality of electrical outlets 1712(1-*m*). The residential fault diagnostics tool 1720 can record, store, experience electrical conditions which are also experienced by the electronic circuit breaker 1717.

The third system 1705 further comprises a communicating device 1722 such as a personal computer or a laptop device running an application (APP) 1725 and provides a user interface 1727 to display relevant diagnostics information 1730 for an end user 1732. The communicating device 1722 is configured to be in wireless communication with the residential fault diagnostics tool 1720. The personal computer or the laptop device 1722 includes a classification analyzer 1735 for the identification of the loads 1707(1-*n*) such that a load that tripped is identified by running a classification analysis by the classification analyzer 1735 to derive a likelihood match of the load with a known load.

The personal computer or the laptop device 1722 can be tailored to receive electrical signals and waveforms on demand when requested by the end user 1732 using the communicating device 1722. In operation, a decision of the identification is provided on the personal computer or the laptop device 1722.

The residential fault diagnostics tool 1720 and the application (APP) 1725 when encountered with an unknown load can be updated with a newer firmware or a newer application (APP). The newer firmware or the newer application (APP) are a result of a retrained neural network model or a machine learning model resulting from receiving information related to a troublesome load and signals/waveforms of the troublesome load.

The residential fault diagnostics tool 1720 is configured to wirelessly connect to the personal computer or the laptop device 1722. The classification analyzer 1735 of the personal computer or the laptop device 1722 analyzes signals using a neural networks model or a machine learning model.

Figure 18:
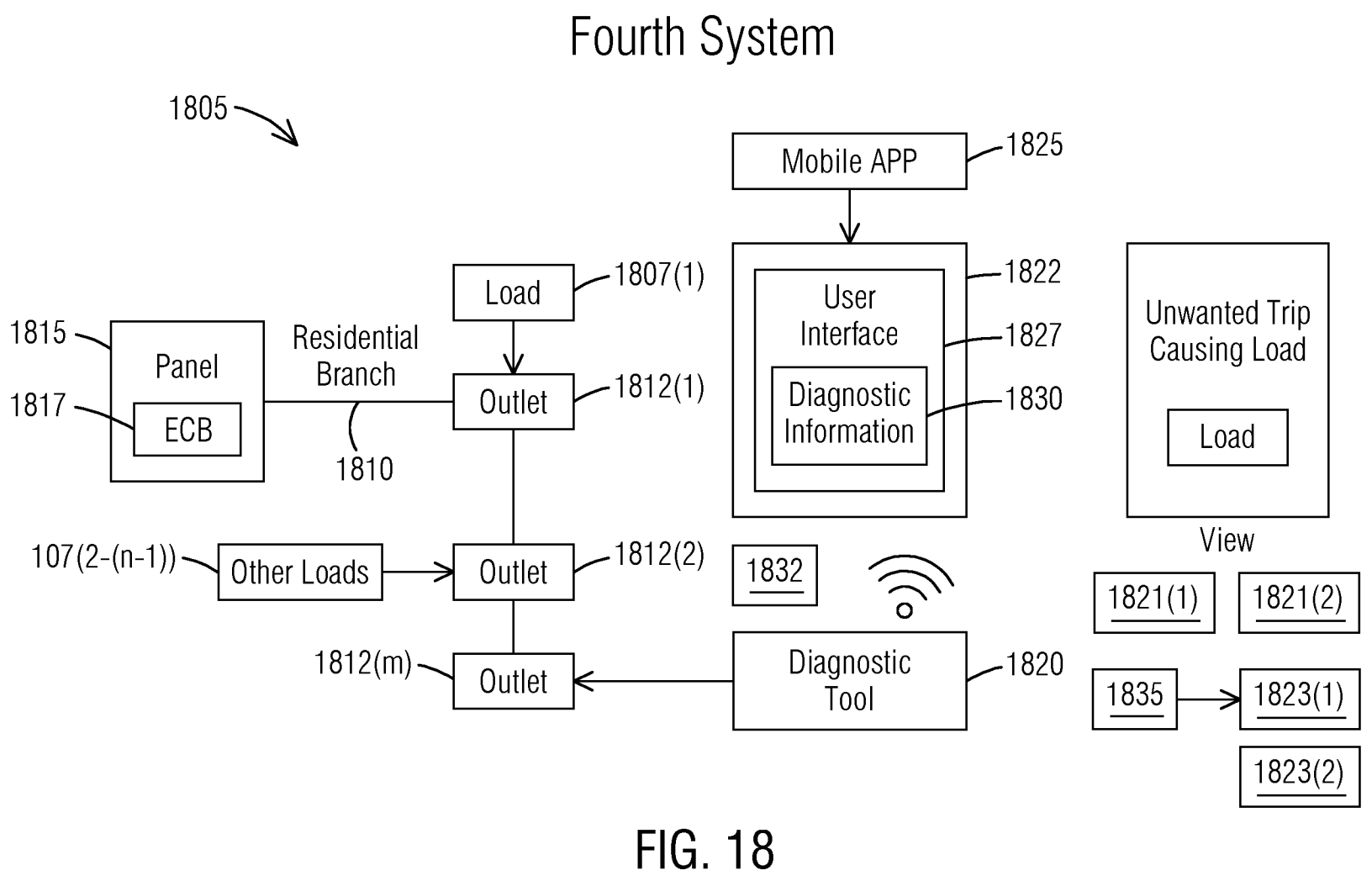

FIG. 18 illustrates a fourth system 1805 for identification of loads 1807(1-*n*) in a residential branch 1810 of electrical circuit including a plurality of electrical outlets 1812(1-*m*) in accordance with an exemplary embodiment of the present invention. The fourth system 1805 comprises a residential power distribution panel 1815 comprising an electronic circuit breaker 1817 connected with the residential branch 1810 of electrical circuit such that the residential branch 1810 of electrical circuit has multiple connected loads 1807(1-*n*) to the plurality of electrical outlets 1812(1-*m*). The electronic circuit breaker 1817 may experience unwanted tripping in the residential branch 1810 of electrical circuit.

The fourth system 1805 further comprises a residential fault diagnostics tool 1820 connected to the residential branch 1810 of electrical circuit via one of outlets of the plurality of electrical outlets 1812(1-*m*). The residential fault diagnostics tool 1820 can record, store, experience electrical conditions which are also experienced by the electronic circuit breaker 1817. The fourth system 1805 further comprises a communicating device 1822 such as a mobile device (e.g., a cell phone or a tablet) running a mobile application (APP) 1825 and provides a user interface 1827 to display relevant diagnostics information 1830 for an end user 1832.

The mobile device 1822 is configured to be in communication with the residential fault diagnostics tool 1820. The residential fault diagnostics tool 1820 is configured to wirelessly connect to a wireless router 1821(1) or a hot spot 1821(2) and the residential fault diagnostics tool 1820 is configured to wirelessly connect to the mobile device 1822.

The residential fault diagnostics tool 1820 and the mobile application (APP) 1825 periodically communicate with a cloud interface 1823(1) or a cloud end point 1823(2) that includes a classification analyzer 1835 for the identification of the loads 1807(1-*n*) such that a load that tripped is identified by running a classification analysis by the classification analyzer 1835 to derive a likelihood match of the load with a known load. The mobile device 1822 can be tailored to receive electrical signals and waveforms on demand when requested by the end user 1832 using the mobile device 1822. In operation, a decision of the identification is provided on the mobile application (APP) 1825.

The residential fault diagnostics tool 1820 and the mobile application (APP) 1825 when encountered with an unknown load can be updated with a newer firmware or a newer mobile application. The newer firmware or the newer mobile application (APP) are a result of a retrained neural network model or a machine learning model resulting from receiving information related to a troublesome load and signals/waveforms of the troublesome load.

The residential fault diagnostics tool 1820 can provide a means to charge the mobile device 1822 during the duration of a troubleshooting exercise through a prior art wired means. The residential fault diagnostics tool 1820 can alternately provide a means to charge the mobile device 1822 during the duration of the troubleshooting exercise through a prior art wireless charging interface.

While a residential power distribution panel is described here a range of one or more other types of power distribution panels are also contemplated by the present invention. For example, other types of power distribution panel may be implemented based on one or more features presented above without deviating from the spirit of the present invention.

The techniques described herein can be particularly useful for an electronic arc fault circuit interrupter for use in a residential power distribution panel. While particular embodiments are described in terms of the electronic arc fault circuit interrupter, the techniques described herein are not limited to the electronic arc fault circuit interrupter but can also be used with other systems.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for identification of loads in a residential branch of an electrical circuit including a plurality of electrical outlets, the system comprising:

a residential power distribution panel comprising an electronic circuit breaker connected with the residential branch of the electrical circuit such that the residential branch of the electrical circuit has multiple connected loads to the plurality of electrical outlets, wherein the electronic circuit breaker may experience unwanted tripping in the residential branch of the electrical circuit, a residential fault diagnostics tool connected to the residential branch of the electrical circuit via one of the outlets of the plurality of electrical outlets, wherein the residential fault diagnostics tool is configured to record, store, and experience electrical conditions which are also experienced by the electronic circuit breaker, and a communicating device comprising a mobile device running a mobile application (APP) and providing a user interface to display relevant diagnostics information for an end user, wherein the mobile device is configured to be in wireless communication with the residential fault diagnostics tool, wherein the mobile application (APP) includes a classification analyzer for the identification of the loads such that a load that tripped is identified by running a classification analysis by the classification analyzer to derive a match of the load with a known load, wherein the mobile device can be tailored to receive electrical signals and waveforms on demand when requested by the end user using the mobile device, wherein a decision of the identification is provided on the mobile application (APP), wherein the residential fault diagnostics tool and the mobile application (APP), when encountered with an unknown load, can be updated with a newer firmware or a newer mobile application, and wherein the newer firmware or the newer mobile application (APP) are a result of a retrained neural network model or a machine learning model resulting from receiving information related to a troublesome load and signals/waveforms of the troublesome load.

2. The system of claim 1, wherein the residential fault diagnostics tool can provide a means to charge the mobile device during the duration of a troubleshooting exercise through a wired means.

3. The system of claim 2, wherein the residential fault diagnostics tool can alternately provide a means to charge the mobile device during the duration of the troubleshooting exercise through a wireless charging interface.

4. A system for identification of loads in a residential branch of an electrical circuit including a plurality of electrical outlets, the system comprising:

a residential power distribution panel comprising an electronic circuit breaker connected with the residential branch of the electrical circuit such that the residential branch of the electrical circuit has multiple connected loads to the plurality of electrical outlets, wherein the electronic circuit breaker may experience unwanted tripping in the residential branch of the electrical circuit, a residential fault diagnostics tool connected to the residential branch of the electrical circuit via one of the outlets of the plurality of electrical outlets, wherein the residential fault diagnostics tool is configured to record, store, and experience electrical conditions which are also experienced by the electronic circuit breaker, and a communicating device comprising a mobile device running a mobile application (APP) and providing a user interface to display relevant diagnostics information for an end user, wherein the mobile device is configured to be in wireless communication with the residential fault diagnostics tool, wherein the residential fault diagnostics tool includes a classification analyzer for the identification of the loads such that a load that tripped is identified by running a classification analysis by the classification analyzer to derive a match of the load with a known load, wherein the residential fault diagnostics tool can be tailored to receive electrical signals and waveforms on demand when requested by the end user using the mobile device, wherein a decision of the identification is provided on the mobile application (APP), wherein the residential fault diagnostics tool and the mobile application (APP), when encountered with an unknown load, can be updated with a newer firmware or a newer mobile application (APP), and wherein the newer firmware or the newer mobile application (APP) are a result of a retrained neural network model or a machine learning model resulting from receiving information related to a troublesome load and signals/waveforms of the troublesome load.

5. The system of claim 4, wherein the residential fault diagnostics tool can provide a means to charge the mobile device during the duration of a troubleshooting exercise through a wired means.

6. The system of claim 5, wherein the residential fault diagnostics tool can alternately provide a means to charge the mobile device during the duration of the troubleshooting exercise through a wireless charging interface.

7. A system for identification of loads in a residential branch of an electrical circuit including a plurality of electrical outlets, the system comprising:

a residential power distribution panel comprising an electronic circuit breaker connected with the residential branch of the electrical circuit such that the residential branch of the electrical circuit has multiple connected loads to the plurality of electrical outlets, wherein the electronic circuit breaker may experience unwanted tripping in the residential branch of electrical circuit, a residential fault diagnostics tool connected to the residential branch of the electrical circuit via one of the outlets of the plurality of electrical outlets, wherein the residential fault diagnostics tool is configured to record, store, and experience electrical conditions which are also experienced by the electronic circuit breaker, and a communicating device comprising a personal computer or a laptop device running an application (APP) and providing a user interface to display relevant diagnostics information for an end user, wherein the communicating device is configured to be in wireless communication with the residential fault diagnostics tool, wherein the personal computer or the laptop device includes a classification analyzer for the identification of the loads such that a load that tripped is identified by running a classification analysis by the classification analyzer to derive a match of the load with a known load, wherein the personal computer or the laptop device can be tailored to receive electrical signals and waveforms on demand when requested by the end user using the communicating device, wherein a decision of the identification is provided on the personal computer or the laptop device, wherein the residential fault diagnostics tool and the application (APP), when encountered with an unknown load, can be updated with a newer firmware or a newer application (APP), and wherein the newer firmware or the newer application (APP) are a result of a retrained neural network model or a machine learning model resulting from receiving information related to a troublesome load and signals/waveforms of the troublesome load.

8. The system of claim 7, wherein the residential fault diagnostics tool is configured to wirelessly connect to the personal computer or the laptop device.

9. The system of claim 8, wherein the classification analyzer of the personal computer or the laptop device analyzes signals using a neural networks model or a machine learning model.

10. A system for identification of loads in a residential branch of an electrical circuit including a plurality of electrical outlets, the system comprising:

a residential power distribution panel comprising an electronic circuit breaker connected with the residential branch of the electrical circuit such that the residential branch of the electrical circuit has multiple connected loads to the plurality of electrical outlets, wherein the electronic circuit breaker may experience unwanted tripping in the residential branch of electrical circuit, a residential fault diagnostics tool connected to the residential branch of the electrical circuit via one of the outlets of the plurality of electrical outlets, wherein the residential fault diagnostics tool is configured to record, store, and experience electrical conditions which are also experienced by the electronic circuit breaker, and a communicating device comprising a mobile device running a mobile application (APP) and providing a user interface to display relevant diagnostics information for an end user, wherein the mobile device is configured to be in communication with the residential fault diagnostics tool, wherein the residential fault diagnostics tool is configured to wirelessly connect to a wireless router or a hot spot, and the residential fault diagnostics tool is configured to wirelessly connect to the mobile device, wherein the residential fault diagnostics tool and the mobile application (APP) periodically communicate with a cloud interface or a cloud end point that includes a classification analyzer for the identification of the loads, such that a load that tripped is identified by running a classification analysis by the classification analyzer to derive a match of the load with a known load, wherein the mobile device can be tailored to receive electrical signals and waveforms on demand when requested by the end user using the mobile device, wherein a decision of the identification is provided on the mobile application (APP), and wherein the residential fault diagnostics tool can provide a means to charge the mobile device during the duration of a troubleshooting exercise through a wired means.

11. The system of claim 10, wherein the residential fault diagnostics tool can alternately provide a means to charge the mobile device during the duration of the troubleshooting exercise through a wireless charging interface.

12. The system of claim 10, wherein the residential fault diagnostics tool and the mobile application (APP) when encountered with an unknown load can be updated with a newer firmware or a newer mobile application.

13. The system of claim 12, wherein the newer firmware or the newer mobile application (APP) are a result of a retrained neural network model or a machine learning model resulting from receiving information related to a troublesome load and signals/waveforms of the troublesome load.

* * * * *